350-375 SR
OR 3,650,600

United States
Courtens

[15] 3,650,600
[45] Mar. 21, 1972

[54] OPTICAL PULSE DOUBLER UTILIZING SELF-INDUCED TRANSPARENCY

[72] Inventor: Eric L. Courtens, Adliswil, Switzerland
[73] Assignee: International Business Machines Corporation, Armonk, N.Y.
[22] Filed: Aug. 13, 1970
[21] Appl. No.: 63,349

[30] Foreign Application Priority Data
Aug. 25, 1969 Switzerland ..................12845/69

[52] U.S. Cl..............................350/151, 350/150, 350/157
[51] Int. Cl.........................................................G02f 1/22
[58] Field of Search ....................350/150, 151, 154, 160; 331/94.5

[56] References Cited
OTHER PUBLICATIONS

McCall et al., "Self-Induced Transparency" Physical Review Vol. 183, No. 2 (July 10, 1969) pp. 457–485

Primary Examiner—David Schonberg
Assistant Examiner—Paul R. Miller
Attorney—Hanifin & Jancin and Frank Chadurjian

[57] ABSTRACT

Two circularly polarized components, displaced in both time and space, of a polarized light pulse are obtained in an optically resonant medium when the medium operates under the conditions of self-induced transparency. By operating the resonant medium near, but not at, exact resonance and therefor at a position slightly displaced from the absorption resonance line of the medium, application of an axial magnetic field causes an impinging polarized light pulse to be separated into two circularly polarized components.

14 Claims, 8 Drawing Figures

Patented March 21, 1972 3,650,600

INVENTOR.
ERIC L. COURTENS
BY Frank Chaslenjian
ATTORNEY

OPTICAL PULSE DOUBLER UTILIZING SELF-INDUCED TRANSPARENCY

BACKGROUND OF INVENTION & PRIOR ART

This invention relates to a method and apparatus for the generation of separated optical pulses making use of nonlinear optical propagation effects.

The quantum electronic effect of "self-induced transparency" is a nonlinear optical propagation effect whereby a normally opaque medium becomes transparent to coherent light pulses. The light pulses are absorbed and continuously re-emitted by the system being excited at its optical resonant frequency, and the intensity and shape of the pulses re-emitted remain essentially unchanged. In this manner, the medium becomes transparent to the laser light, the latter penetrating the medium without any appreciable attenuation. This effect has been reported in the literature by, among others, S. L. McCall and E. L. Hahn in a paper entitled "Self-induced Transparency by Pulsed Coherent Light," Physical Review Letters, Vol. 18, No. 21 of May 22, 1967, pages 908–911. This paper deals with a system comprising a ruby laser as an optical transmitter and a ruby crystal as an optically resonant medium. C. K. N. Patel and R. E. Slusher have also described the effect in their paper entitled "Self-induced Transparency in Gases," Physical Review Letters, Vol. 19, No. 18 of Oct. 30, 1967, pages 1019–1022.

Reference is made in the literature to the so-called $2\pi$-pulses, which pulses are explained in terms of the Feynman vector model that relates to the Schrodinger's equation. In this model the pseudo-dipole moment vector runs through a complete circle when a two-level system is excited from its ground state to the upper level and then back to its ground state (Journal of Applied Physics, Vol. 28, No. 1, Jan. 1957, pages 49–52). One of the known properties of these $2\pi$-pulses lies in the fact that, within the resonant medium their propagation velocity, i.e., their signal velocity, is strongly decreased under the conditions of self-induced transparency. This effect is utilized in the implementation of this invention and is also described by the inventor in a paper entitled "Giant Faraday Rotations in Self-Induced Transparency," Physical Review Letters, Vol. 21, No. 1 of July 1, 1968, wherein it is stated that with the resonance effect of self-induced transparency there is connected not only a strongly decreased propagation velocity of light, i.e., the signal velocity, but also a giant Faraday effect. This novel effect is also described by the inventor in a copending application entitled "Light Modulation by Resonant Faraday Effect," U.S. Pat. No. 3,602,574, issued on Aug. 31, 1971, which is assigned to the assignee of this application.

For further background, reference is made to an article by S. L. McCall and E. L. Hahn appearing in the Bulletin American Physical Society, Vol. 18, No. 21 (1967) at page 1189 entitled, "Coherent Light Propagation Through an Inhomogeneously Broadened Two-Level System" and an article by C. K. Rhodes, A Szoke and A. Javan entitled, "The Influence of Level Degeneracy on the Self-Induced Transparency Effect," Physical Review Letters, Vol. 21, No. 16 of Oct. 14, 1968, pages 1151–1155.

SUMMARY OF THE INVENTION

In operation of devices of the type disclosed in the aforementioned copending application, where a train of pulses from a mode locked laser was utilized for data transmission, it was found that a natural upper-limit exists regarding the achievable separation of generated light pulses with respect to time and space. This separation is usually limited to the cavity round-trip time which is defined by the ratio of twice the length of the laser cavity divided by the propagation velocity of the optical pulses. By employing the apparatus and method of this invention, the natural upper-limit, which previously existed, is surpassed by making use of nonlinear optical propagation effects. More specifically, coherent polarized optical pulses are passed through an optically resonant medium under such conditions that self-induced transparency occurs. The center frequency of the optical pulses is chosen such that the resonant medium operates near, but not at, exact resonance and therefor at a position slightly displaced from the absorption resonance line of the medium. An axial magnetic field is then applied to the medium and acts in such a manner that each of the impinging optical pulses are separated in time and space into two circularly polarized components.

Accordingly, it is an object of this invention to provide an improved method and apparatus for the modulation of light.

It is a further object of this invention to provide an improved light generator.

A further object of this invention is to provide a light pulse generator which is capable of attaining a self-induced transparency state which is operated at a position displaced from its absorption line to provide two circularly polarized components of each impinging light pulse.

Another object of this invention is to provide a light pulse generator which is energized by a polarized light pulse source to attain a self-induced transparency state when resonating at a point near, but not at, exact resonance, wherein application of an axial magnetic field causes the impinging optical pulses to be separated in time and space into two circularly polarized components.

Still a further object of this invention is to provide a method of generating closely separated optical pulses by passing coherent linearly polarized optical pulses through an optically resonant medium, to produce self-induced transparency, where the center frequency of the optical pulses is chosen to be slightly displaced from the absorption line, and by applying an axial magnetic field to the resonant medium such that impinging optical pulses are separated in time and space into circularly polarized components.

The foregoing and other objects, features and advantages of the invention will be apparent from the following more particular description of a preferred embodiment of the invention, as illustrated in the accompanying drawings.

BRIEF DESCRIPTION OF THE DRAWINGS

In FIG. 1 a solid line represents an arbitrary spectral distribution function $g(\Delta\omega)$ which describes the absorption of radiation by an excitable resonant center. With its aid the properties of an optically resonant medium can be described quantitatively. Said distribution function is valid in the case of absence of the magnetic field.

Figure 1:
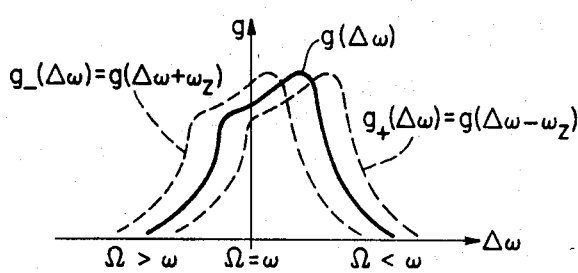
FIG. 1 illustrates a spectral distribution function of the resonant centers, of arbitrary shape, in the case of absence of a magnetic field, and its separation into two similar functions displaced from each other by the Zeeman-splitting in case of presence of an axial magnetic field.

In case an axial magnetic field is acting, there occurs a magnetic level splitting according to the Zeeman-effect. The spectral line separates into two or several Zeeman lines. For explanation purposes a Kramer's doublet is taken as the two-level system, i.e., a transition from a state with the quantum number J = one-half to another state with the quantum number J = one-half. In this case, upon the application of a magnetic field parallel to the direction of propagation z of the optical field, the spectral line splits into two components. This is illustrated in FIG. 1 by the two distribution functions, represented by dotted lines, $g_+(\Delta\omega) = g(\Delta\omega-\omega_z)$ and $g_-(\Delta\omega) = g(\Delta\omega+\omega_z)$, which are separated by the Zeeman-splitting $\omega_z$. Here, the independent variable $\Delta\omega$ is defined as difference $\Delta\omega = \omega-\Omega$ of the running frequency $\omega$ and the frequency $\Omega$ of the optical carrier. This difference, i.e., the coordinate $\Delta\omega$ is positive when the independent variable $\omega$ is greater than the frequency of the optical carrier. All frequencies are measured in angular frequency. The selection rule is such that only $\Delta M = \pm 1$ transitions take place. The $g_+(\Delta\omega)$ line corresponds to one sense of circular polarization ($\Delta M = +1$), and the other line to the other sense of polarization.

Some definitions are now given of quantities which are used in the above cited literature sources in a similar way. A quantity characteristic of the duration of the optical pulses is denoted by $\tau$. It essentially corresponds to the half-width, i.e., the pulse duration or time separation between the wings of the pulse measured at half intensity. This quantity $\tau$ must be shorter than the homogeneous part of the transverse relaxation time of the resonant transition. This assumption is necessary so that the influence of relaxation effects between the levels can be neglected.

For simplification it is also assumed that $kT >> \hbar\omega_z$, i.e., the thermal energy is much larger than the Zeeman splitting energy ($k$ is the Boltzmann-constant, $T$ is the absolute temperature, $\hbar$ is the Planck's constant divided by $2\pi$, and $\omega_z$ is the Zeeman-splitting measured as angular frequency). Thus, it is assumed that the sub-levels of the ground state are equally populated. This is by no means necessary, but simplifies the following description.

The doubling of an optical pulse is achieved in the following manner. A linearly polarized pulse is impinging upon the resonant medium in such a manner that transparency occurs. The two circularly polarized components of this pulse propagate with different velocities due to the action of an applied magnetic field, as explained below.

The spectral distribution function $g(\Delta\omega)$ is valid for the unsplit spectral line in the absence of a magnetic field. Due to the action of an applied axial magnetic field both spectral distribution functions belonging to the components of the split pulse $g(\Delta\omega \pm \omega_z)$ are separated from each other by the Zeeman-splitting. The propagation velocities of each component can be determined from the given quantities. The inverse propagation velocity is given by $$V_\pm^{-1} = \frac{n}{c} + A\tau^2 \int_{-\infty}^{+\infty} \frac{g_\pm(\Delta\omega)}{1+\Delta\omega^2\tau^2} d(\Delta\omega)$$

Here, $n$ designates the refractive index of the optically resonant medium without taking into consideration the contribution of the resonant centers, i.e., the refractive index of the mere host lattice in case of a crystal medium, and $c$ the vacuum velocity of light, i.e., the propagation velocity of optical energy in empty space.

The system constant $A = 4\pi N\omega p^2/nc\hbar$ combines some properties of the two-level system used and several natural constants. $N$ represents the density of resonant centers in one of the Zeeman sub-levels interacting with the electromagnetic radiation; $p$ designates the strength of interaction, by making it equal, e.g., to the x- or y-component of the macroscopic dipole moment of the transition. The influence of the magnetic field is taken into account by the magneto-gyric ratio $\gamma = \omega_z/H = g\beta/\hbar$, the ratio of Zeeman-splitting to the field strength $H$ of the magnetic field; $g$ is the so-called g-factor of spectroscopic separation factor which is also called Lande-factor; and $\beta$ is the Bohr-magneton.

The quantum electronic effect of self-induced transparency is an optical resonance effect whereby a normally absorbing medium becomes non-absorbing to coherent light pulses having an electric field with a determined strength. The two-level system excited with its optical resonance frequency continuously absorbes and re-emits the impinging light pulse, thereby intensity and pulse shape remain substantially unchanged. Thus, the medium becomes so to say, transparent, to the laser light which passes practically without loss. After a vector model introduced by Feynman, Vernon and Hellwarth, which model describes the solution of the special Schrodinger equation for a two-level system, said vector runs through a complete circle or $2\pi$ when the system is excited from ground state to an upper level and returns to its lower level completely and in proper phase relationship. Light pulses fulfilling exactly this condition under the considered system are, therefore, called $2\pi$-pulses in the literature. The time integrated field strength of the impinging coherent and linearly polarized optical pulses must fulfill the $2\pi$ condition; furthermore, the pulse shape, i.e., the envelope of the optical carrier, is also determined. Further details may be taken from the above-cited literature sources.

To carry out the method for the generation of closely separated optical pulses, such $2\pi$-pulses are impinging upon an optically resonant medium chosen as suitable two-level system. However, operation is not effected at sharp resonance, i.e., at exactly matching frequencies of the optical carrier and of the absorption line, but at a point displaced from exact resonance by a certain amount. If, in addition, an axial magnetic field is acting upon the resonant centers, within a certain effective length of resonant medium, then the originally linearly polarized optical pulse separates into its two circularly polarized components which are separated in this manner from each other with respect to time and space.

This operation mode is not to be identified or to be confused with a modulation method for $2\pi$-pulses thereby with the application of an axial magnetic field a strong rotation of the plane of polarization of the optical pulses is obtained. By this latter method, operation is performed at exact resonance. The Faraday rotation is caused by the different dispersion characteristics of the two Zeeman sub-levels, and this is maximum at exact resonance.

Contrary to said modulation method, when carrying out the method of this invention, the different "absorption properties" of the medium with respect to the two circularly polarized components of the optical pulses are used, creating a difference between the propagation velocities of the components. Absorption is put between quotation marks because one cannot speak of absorption in the usual sense when speaking of the effect of self-induced transparency. At exact resonance the application of a magnetic field does not cause a relative change of "absorption" of the two circularly polarized components. On the contrary, off-resonance, i.e., in a wing of the absorption line, the application of a magnetic field can change considerably the relative "absorption" of the two components.

With the restriction that only a small Zeeman-splitting should exist, an inverse separation length can be defined in the following way:

$$L^{-1} = \frac{V_-^{-1} - V_+^{-1}}{2H\tau} = 2A\gamma\tau^2 \int_{-\infty}^{+\infty} \frac{(\Delta\omega\tau)g(\Delta\omega)}{[1+(\Delta\omega\tau)^2]^2} d(\Delta\omega)$$

$L$ is the length of the resonant medium required to achieve separation of the pulse components by a distance $2\tau$ at the output of the separating device by the application of a unit field strength of magnetic field H. A positive $L$ value shows that with positive magnetic field $H$ the $\sigma_+$—component is the first to arrive at the output.

Figure 2:
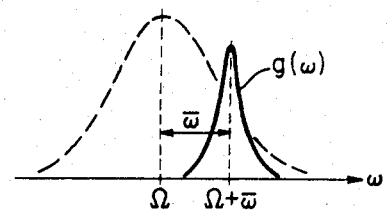
FIG. 2 schematically illustrates the relation of the optical frequencies of the light pulse and of the absorption line according to this invention.

FIG. 2 schematically shows the relation of the optical frequencies of light pulse and absorption line when carrying out the inventive method. Operation is done in the off-resonance state. The optical pulse with the carrier frequency $\Omega$ is displaced from the center of the absorption line by the amount $\bar{\omega}$ measured as angular frequency. The center frequency of the optical pulses is chosen to be equal to a frequency on a wing of the absorption line. Only in this way the separation in time and space of the circularly polarized components of the optical pulses, when they are absorbed at resonance and re-emitted, can be achieved. The above defined value $L^{-1}$ of the inverse separation length becomes zero in case of resonance. That means that the inventive method is only feasible when the center frequencies of the pulses and of the absorption line are displaced from each other by a certain amount.

Without being true to scale, the dotted lines of FIG. 2 schematically illustrate the envelope of an optical pulse with its center frequency $\Omega$, while the solid lines illustrate the distribution function $g(\omega)$ of a sharp absorption line the center frequency of which is displaced from the frequency $\Omega$ by the amount $\bar{\omega}$.

To estimate the values of the parameters for the inventive method, the borderline cases of a sharp absorption line and of a broad absorption line are considered.

For a sharp absorption line, a profile $g(\Delta\omega) = \delta(\Delta\omega - \bar{\omega})$ is taken, where $\delta$ is a Dirac delta function. The calculation of the inverse separation length gives in this case $$L^{-1} = 2A\gamma\tau^2 \frac{\bar{\omega}\tau}{[1+(\bar{\omega}\tau)^2]^2}.$$

The optimum value of the frequency displacement pulse duration product is found to be $\bar{\omega}\tau = 1/\sqrt{3}$, i.e., this is the value which causes a maximum separation of the two pulse components for a given $\gamma$ and unit field. Inserting this value leads to the maximum inverse separation length, i.e., the minimum required length for separation $$(L^{-1})\,\text{max} \approx 0.65\, A\gamma\tau^2.$$

For a broad absorption line a Gaussian distribution is considered:

$$g(\Delta\omega) = \frac{T}{\sqrt{2\pi}} \exp\left[-\frac{T^2(\Delta\omega - \bar{\omega})^2}{2}\right]$$

Here, $T$ is a parameter of the distribution and corresponds to approximately the half-width of the absorption line at maximum intensity. The calculation of the inverse separation length leads to the following integral:

$$L^{-1} = \frac{A\gamma T^3}{\tau\sqrt{2\pi}} \int_{-\infty}^{+\infty} \frac{u \exp\left(-\frac{T^2 u^2}{2\tau^2}\right)}{1+(u-\bar{\omega}\tau)^2}\, du$$

For each resonant two-level system to be considered, the evaluation of this integral must be done numerically. However, later in the description, an example of a simplified evaluation will be shown.

It is essential that the effect can be large, i.e., the separation length or the effective length of optically active material can be relatively small. The properties of the two-level system used contribute to the effectiveness. These are represented by the above mentioned product $A\gamma$. As an example this value is for the $^2S_{1/2} \rightarrow {}^2P_{1/2}$ transition in potassium vapor at 300° C. $A\gamma$ = 7,3.$10^{18}$ Oe$^{-1}$cm.$^{-1}$sec.$^{-2}$. For the $^4A_2(\pm 1/2) \rightarrow {}^2E(\bar{E})(\pm_{1/2})$ transition in ruby with 0.05% Cr$^{3+}$ concentration at liquid helium temperature, this value is $A\gamma$ = 6.$10^{17}$ Oe$^{-1}$cm.$^{-1}$sec.$^{-2}$.

A requirement for the operation of the inventive method consists in that the homogeneous part of the transverse relaxation time of the broadened absorption line of the optically resonant material used be appreciably larger than the duration of the impinging optical pulses. The line width $\Gamma$ consists of two portions, the first portion $\Gamma'$ being the contribution of the homogeneous line broadening, and the second portion $\Gamma^*$ being the contribution of the inhomogeneous line broadening. The line width is measured in angular frequency as half the width at half-intensity. The reciprocal $T_2 = 1/\Gamma$ is called the transverse relaxation time, that is, the meantime in which the coherence between virtual spins is destroyed by statistical processes of the kind of collision processes or by other influences disturbing the phase relation. In a similar manner this relaxation time consists of two portions $T_2' = 1/\Gamma'$ and $T_2^* = 1/\Gamma^*$. The homogeneous relaxation time $T_2'$ of the resonant transition must be larger than the pulse duration $\tau$. Many combinations of light sources and materials are possible which may be used with the described method.

Normally, solid state materials that are to be excited to self-induced transparency by the giant pulses of usual Q-switched giant pulse lasers must be cooled to ensure that the homogeneous relaxation time is longer than the duration of the used giant pulses. When Q-switching a giant pulse laser, optical pulses can be generated which have a pulse duration in the order of magnitude of $10^{-9}$ through $10^{-8}$ seconds. Therefore, the ruby crystal in the slow wave structure of the below described system ruby laser-ruby crystal has to be cooled down to helium temperature. However, if as an optical transmitter a mode-locked laser is used, pulse durations in the order of magnitude of $10^{-12}$ seconds are feasible. Since many solid state materials show transverse relaxation times longer than $10^{-12}$ seconds, systems which can operate at higher temperatures, even at room temperature, are also possible.

An increasing number of so-called coincidences are becoming known between laser lines and excitable electronic or vibrational transitions which can be used for self-induced transparency and hence for the described method. These possibilities multiply by the application of laser structures tunable over a wider spectral range or by the application of parametric conversion for the generation of coherent light. Thus, the radiation of the optical transmitter can be tuned and matched to the requirements of the absorber material.

In the following, a special system ruby laser ruby crystal is used for explanation purposes in which the laser operates at nitrogen temperature and the ruby crystal at helium temperature. The cooling of the ruby absorber at liquid helium temperature ensures a sufficiently large homogeneous relaxation time. The cooling of the laser at liquid nitrogen temperature brings the output frequency due to the transition $^4A_2(\pm 3/2) \rightarrow {}^2E(\bar{E})$ in coincidence with the absorption frequency of the ruby crystal at helium temperature due to the transition $^4A_2(\pm 1/2) \rightarrow {}^2E(\bar{E})$.

The parameters of the system being considered, i.e., of the ruby crystal, take the following values. The effective number of excitation centers per volume, i.e., of the Cr$^{3+}$ ions can be $N_{eff} = 10^{19}$ cm$^{-3}$ which corresponds to 0.05% Cr$^{3+}$ concentration. The parameter characteristic of the strength of interaction between field and matter, i.e., the square of the dipole moment of the transition, is $p^2 = 5 \cdot 10^{-41}$ erg cm$^3$; the refractive index of the host crystal Al$_2$O$_3$ is $n = 1.76$. The angular frequency of light is approximately $\omega = 2.7 \cdot 10^{15}$ sec$^{-1}$. The gyromagnetic ratio is $\gamma = 0.23\beta/\hbar = 2 \cdot 10^6$ emu. Hence, the product characteristic of the properties of the two-level system becomes $A\gamma = 6 \cdot 10^{17}$ Oe$^{-1}$ sec$^{-2}$, where the system constant A is defined by $A = 4\pi N_{eff}\omega p^2/nc\hbar$.

At the chosen low temperature the inhomogeneous absorption line shows a profile with Gaussian distribution having a line width at half intensity of about 0.1 cm$^{-1}$. The characteristic time of this distribution, evaluated from this linewidth, is $T = 1.2 \cdot 10^{-10}$ sec. The off-resonance operation point should be at the lower frequency wing of the $^4A_2(\pm½)\leftrightarrow{}^2E(\bar{E})$ transition. The next following higher frequency $^4A_2(\pm 3/2) \leftrightarrow {}^2E(\bar{E})$ transition is displaced from the line maximum by about 0.38 cm$^{-1}$. Its influence can be disregarded since the magnetic fields to be considered with the inventive method are lower than 1 Kilogauss.

It is now assumed that the optical pulse duration is longer than the characteristic time describing the linewidth of the active medium. The following evaluation must be based on the estimate which applies to a broadened absorption line, as given above. In this case the inverse separation length can be found by evaluating the following integral:

$$L^{-1} = \frac{A\gamma T^3}{\tau\sqrt{2\pi}} \int_{-\infty}^{+\infty} \frac{u \exp-\left(\frac{T^2 u^2}{2\tau^2}\right)}{1+(u-\bar{\omega}\tau)^2} du$$

The meaning of all magnitudes used in the formula is the same as above mentioned. The time parameter of the distribution is designated T, the pulse duration $\tau$, and $\bar{\omega}$ has the meaning of the displacement of the operation point as illustrated by FIG. 2. For simplicity reasons, an auxiliary quantity $\alpha$ is defined by $\bar{\omega} = \alpha T$. With the introduction of the auxiliary quantity $\alpha$ and with the substitution $uT/\tau=x$, the integral can be transformed and simplified in the following manner:

$$L^{-1} = \frac{A\gamma T\tau}{\sqrt{2\pi}} \int_{-\infty}^{+\infty} \frac{x \exp-\left(\frac{x^2}{2}\right) dx}{1+\left(\frac{\tau}{T}\right)^2 (x-\alpha)^2}$$

The denominator of the integrand is minimum and equal to unity when $x = \alpha$. Since $\omega$ is assumed to be much larger than $T$, the main contribution to the integral occurs in the region $x \rightarrow \alpha$. In that region the numerator is approximately constant and equal to $\alpha \exp[-\alpha^2/2]$. This numerator has its maximum value for $\alpha = 1$. Hence, $\alpha = 1$ is the value of $\alpha$ for which the integral is maximum. According to the above definition of the auxiliary quantity $\alpha$, this means that the optimum operation point for the method of generation of closely separated optical pulses lies at a distance $\bar{\omega} = 1/T$ off-resonance.

To estimate the integral the numerator of the integrand can be considered constant and equal to exp $[-½]$ (in case $\alpha = 1$). This leads to the optimum inverse separation length: $L^{-1}_{max} \approx \sqrt{\pi/2e}\, A\gamma T^2 \approx 0.66 \cdot 10^{-2}$ cm$^{-1}$.
Therefrom, the optimum value of active length of the optically resonant material can be calculated to be 150 cm. for a magnetic field of 1 Gauss. Of course, the active length of the actual device can be smaller if one can apply higher magnetic fields, or if one is satisfied with a smaller pulse separation than $2\tau$.

Two distinct embodiments that utilize the system ruby laser — ruby crystal for the purpose of pulse doubling will now be explained.

Figure 3:
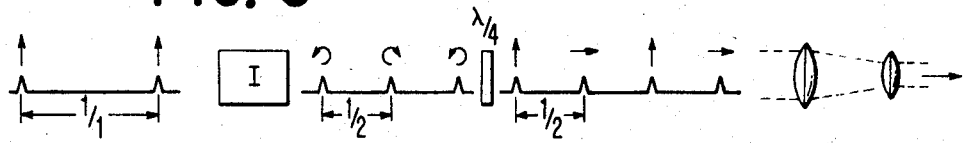
FIG. 3 schematically illustrates an application of the method for doubling a train of optical pulses whereby means are provided to change the state of polarization of the pulse train and to maintain the proper conditions for self-induced transparency.
Figure 4:
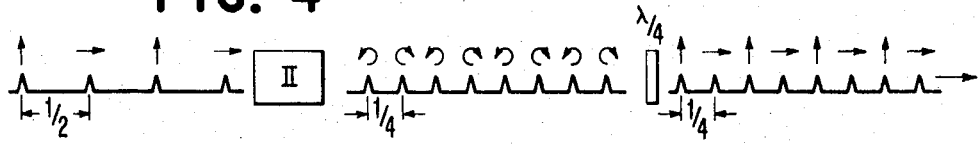
FIG. 4 illustrates a means by which given pulse sequences may be multiplied.

First, a train of impinging optical pulses is considered that may have a duration of about 1 nsec and are separated in time by 10 nsec. Then $\tau$ 10$^{-9}$ sec and the pulse repetition rate is 10$^8$ per sec. This pulse sequence is to be doubled and quadrupled, in two steps into a sequence of nsec-pulses following each other at a distance of 2.5 nsec. FIGS. 3 and 4 schematically indicate this method. A train of linearly polarized pulses impinges upon a first pulse doubler device 1. The polarization state is indicated by respective arrows above the symbols for the pulses. The output signals are a train of light pulses with half the distance compared to the impinging pulses. These output pulses are alternately left-circularly and right-circularly polarized, as symbolically indicated by the curved arrows.

Device I consists of a ruby crystal cooled to liquid helium temperature for the reasons explained above, and placed in the axis of a solenoid capable of producing an axial magnetic field of a few hundred Gauss. From the value $L_{max} = 150$ cm. that has been calculated above, it is seen that a field strength of about 300 Gauss applied to a ruby crystal of about 1.3 cm. length is sufficient in the present example to cause a separation of the optical pulses by 5 nsec.

For further processing the pulse sequence the train of circularly polarized pulses which is thus produced is passed through a quarter-wave plate to change it into a train of linearly polarized pulses. The output pulse train emerging from the λ/4 plate has been changed, however, to a sequence of pulses alternately polarized in two orthogonal directions, in view of the history of said pulses. This fact is indicated in FIG. 3 by the symbolic arrows showing a sequence of light pulses being polarized alternately vertically and horizontally. To fulfill everywhere the $2\pi$-condition, i.e., to have the appropriate intensity for self-induced transparency, and to compensate for diffraction losses, the optical pulse sequence is to pass a lens system. This is schematically shown at the right-hand side of FIG. 3. In this way a train of linearly polarized light pulses with doubled pulse repetition rate is obtained.

As shown in FIG. 4 this pulse sequence, after having been doubled with the aid of the first device, is now impinging upon a second such pulse doubling device II. Hence, the output pulse train consists of alternately left-circularly and right-circularly polarized optical pulses following each other at a quarter of the distance of the original pulse sequence. Again, a quarter-wave plate provides for the change of the circularly polarized optical pulses into a train of linearly polarized pulses which may be further processed, accordingly. For the same crystal length as in the doubling device I, this second device would do with a field of half the strength, i.e., of approximately 150 Gauss.

Figure 5:
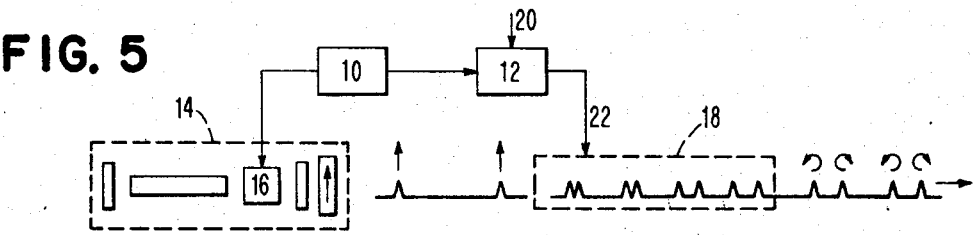
FIG. 5 is a schematic block diagram of an embodiment of this invention whereby linearly polarized laser pulses are separated by a magnetic field of modulating microwave signals with respect to time and space into pulse pairs consisting of the two circularly polarized components of the original optical pulses.
Figure 6:
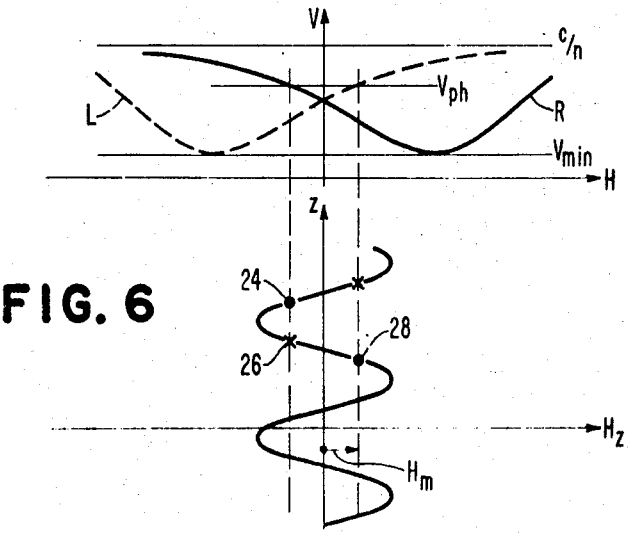
FIG. 6 illustrates the propagation velocity of the envelope of the optical pulses for the two circularly polarized components as a function of the axial magnetic field acting upon the resonant centers in conjunction with a modulating magnetic field having a phase velocity $V_{ph}$.
Figure 7:
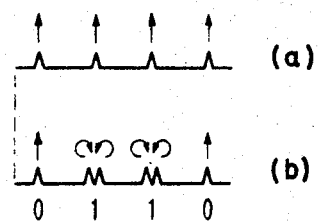
FIGS. 7a and 7b illustrate a possible coding scheme.

As a further embodiment, a pulse train should be modulated with binary information. FIGS. 5, 6 and 7 are used for explanation purposes. As original pulse sequence the same train of nsec pulses is taken, as shown above, following each other at a distance of 10 nsec. Hence, the pulse duration is again $\tau = 10^{-9}$ sec., and the pulse repetition rate is $10^8$ sec.$^{-1}$.

The modulation device corresponds to the scheme shown in FIG. 5. The same material, i.e., pink ruby with about 0.05% Cr$^{3+}$ ion concentration, is used under the same conditions as above. Hence, all parameters of the two-level system are the same. The operation point, i.e., $\bar{\omega}$, is also chosen in the same way.

Here the axial magnetic field for separating the optical pulses into their components is generated by a microwave signal. The phase of this signal is fixed with respect to the pulse separation of the impinging pulse train. A master oscillator 10 provides this time coincidence of the microwave signals generated by the microwave pulse generator 12 and of coherent and polarized light pulses generated by the optical transmitter 14. The optical transmitter 14 is a mode-locked ruby laser with a light modulator 16 in the cavity. In other application the optical transmitter could be any kind of transmitter producing polarized light pulses of an optical frequency which, under consideration of the requirements of the inventive method, lies within the range of the resonant frequency of the medium used for self-induced transparency. It may be, for instance, a solid state laser or a gas laser of suitable intensity. For the generation of so-called giant pulses a Q-switch of the laser cavity may be used. Also, a mode-locked laser may be used, or any other method for the generation of short and intensive optical pulses which utilizes parametric processes.

In the optical transmitter 14 the light modulator 16 controls the repetition rate of the generated optical pulses, according to the frequency of the master oscillator 10. Since this light modulator 4 is switched only by pure periodical signals, a Pockels cell may, for instance, be used.

In the FIG. 5, the optical transmitter 14 is schematically shown as a solid state laser. On the right-hand side, the rectangle including an arrow indicates a polarizer which may be replaced by other polarizing means, e.g., a laser provided with Brewster-windows does generate linearly polarized coherent light pulses without any other polarizing means.

In the optical axis of laser 14, there is a microwave slow wave structure 18 which contains the resonant material upon which the light pulses impinge thereby causing the effect of self-induced transparency. The slow wave structure is designed so as to produce an axial component of the microwave field. The phase velocity of this microwave field is, in the delay device 18, made equal to the propagation velocity of the light pulses.

The linearly polarized light pulses generated by the optical transmitter 14 follow each other equidistantly and impinge upon the slow wave structure 18 where they are strongly delayed by the optically resonant medium. The axial component of the magnetic field of the microwave pulses running concurrently with the light pulses causes an increasing separation of the optical pulses into their components.

In the drawing there is symbolically indicated by respective arrows that the impinging optical pulses are linearly polarized and that the pulse pairs emerging from the device 18 are polarized right-circularly or left-circularly, respectively. In the first case the vertical arrows indicate the linear polarization state, in the second case the curved arrows indicate the respective circular polarization state. The delay of the propagation of the optical pulses within the slow wave structure 18 is indicated by the shorter distance of the centers of the pulse pairs following each other, when being compared to the distance of the impinging pulses.

Modulation of the optical pulses with an information is possible by controlling the axial magnetic field, i.e., by controlling the microwave pulse generator. For a binary notation both binary values may be represented by doubled pulses or single pulses, respectively. This possibility is indicated in the drawing by control input 20 of microwave pulse generator 12. Suitable control signals can be supplied to that input, i.e., from a data processing system. At signal output 22 of microwave pulse generator 12 modulated microwave signals are then available which can modulate the impinging optical pulses within the slow wave structure 18 via the excited resonant centers of the active medium used.

For instance, the slow wave structure 18 may consist of a delay line for microwaves which is built of a helix surrounding a core of the optically active material chosen. The phase velocity of the microwave is smaller than the vacuum light velocity within the slow wave structure. It is matched to the propagation velocity of the optical pulses which is strongly reduced in the optical resonant medium when self-induced transparency occurs. While both kinds of electromagnetic waves are traveling together, the optical pulses are separated into their circularly polarized components by the action of the magnetic field of the microwave upon the resonant centers. The impinging optical pulses are directed axially upon the core, and the helix is fed with the microwave signal.

The required magnetic field strength is now delivered by the modulating field of microwaves. For the representation of one binary value the corresponding light pulses need only be identifiably doubled, or solely broadened, and, therefore, one can do with relatively small fields. There are two kinds of electromagnetic waves propagating in the modulator, the modulating microwave and the optical pulse. These waves are in relative motion, and it can be seen that there exist equilibrium points where both kinds of waves run at the same velocity. This causes a saturation of the achievable pulse separation. This effect can be explained by the relative motion of the optical pulses separating into their circularly polarized components with respect to the modulating microwave field, or better to say, to the longitudinal magnetic component $H_z$ in Z-direction. Thus, the optical pulses are in regions of varying local field strength. This motion, relative to the running field, stops when the optical pulses reaches a field strength value in an equilibrium point where its propagation velocity is equal to the phase velocity of the field.

As shown in FIG. 6, points where the pulse velocity is equal to the microwave phase velocity do exist; they can be either stable or unstable points. In the upper part of FIG. 6 a solid line shows the propagation velocity V of the right-circularly polarized component of the optical pulses as a function of the magnetic field strength H. It is designated R. In a similar manner, a dashed line designated L shows the propagation velocity of the left-circularly polarized component of the optical pulses. It can be seen that at a certain positive value of the magnetic field strength the right-circularly polarized component reaches the minimum propagation velocity $V_{min}$, and that at a corresponding negative field strength value the left-circularly polarized component of the optical pulses reaches the minimum value of the propagation velocity. The upper asymptotic boundary limit of the maximum propagation velocity is given by the refractive index of the host lattice and has the value $c/n$. Between both thin lines representing the boundary values, another thin line shows a propagation velocity value designated $V_{ph}$, which is the value of the phase velocity of the microwave in the slow wave structure. This line intercepts the lines R and L at field values $H_m$ which correspond to either stable or unstable equilibrium points.

The lower part of FIG. 6 shows at one instant of time the periodically varying component of $H_z$ running in the Z-direction with phase velocity $V_{ph}$. Dashed auxiliary lines indicate the positive and negative value $H_m$ of the magnetic field strength at which the pulse velocity is equal to the microwave velocity. These auxiliary lines intercept the curve representing $H_z$ at various spatial points (24, 26, 28) and it will now be shown that half of these are stable propagation points and the other half unstable points.

It is assumed that a right circularly polarized pulse has reached point 24; the value of the magnetic field strength is $-H_m$, and the propagation velocity is the same as the phase velocity. If the optical pulse accidentally moves faster than the microwave field, it gets into a region of smaller field strength, as can be seen from the lower part of the figure. However, from the upper part of the figure it is seen that at the same time its propagation velocity decreases. As a result the optical pulse slows down immediately. Similarly, if the pulse tries slowing down with respect to the microwave, it comes into an increasing field which accelerates it. Therefore, 24 is a stable point of dynamic equilibrium.

Point 26 shown by a cross is an unstable equilibrium point for the right-circularly polarized optical pulse. If the optical pulse accidentally moves faster than the microwave it comes into an increasing and accelerating field. It surpasses the maximum till — with decreasing field — it reaches the propagation velocity $V_{ph}$ corresponding to the stable point 24. Left-circularly polarized pulses behave analogously. Equilibrium points shown as thick points in the figure are stable, those shown by a cross are unstable.

This analysis shows that the maximum achievable pulse separation in this type of modulator is equal to one half of the microwave period. For instance, a linearly polarized pulse at a spatial position z between points 24 and 26 in the lower part of FIG. 6 will progressively separate into its two circularly polarized components, until these reach their positions 24 and 28, and from there on will keep this constant separation. This is very advantageous from a coding point of view, and allows for the unambiguous transmission of digital information, independently of the exact length of resonant material and of the exact strength of the magnetic field, provided these are above some minimum value.

A 0° ruby crystal rod with a diameter of the order of one millimeter serves as a core of the helix. The ratio of conductor length to the helix length is about 30. The desired delay of the electromagnetic waves is in the order of magnitude of 90 for this helix ratio when due account is taken of the dielectric constant of ruby at microwave frequency which is about 9.5 for the TE-wave. To supply a suitable axial magnetic field component the microwave power of the lowest order H-mode must be of the order of a few watts if the diameter of the ruby rod is chosen small enough, e.g., smaller than about 1 millimeter. The laser beam is focused in the ruby crystal. The length of the crystal core is chosen to be of the order of a few centimeters and depends on what separation of the pulse components is desired and what diffraction losses can be tolerated.

Coding can be done in several ways. For instance, the binary information can affect the phase of the microwave so that each linearly polarized pulse is doubled, but the time sequence R-L or L-R carries the information. Another method of coding is by the presence or absence of field. In this latter case, the pulses are either doubled or not doubled. FIG. 7 shows an example of coding by this method. A train of linearly polarized light pulses according to FIG. 7a is coded according to the binary information "0110" in such a manner that according to FIG. 7B out of the four shown pulses, both pulses in the middle are doubled into pulse pairs consisting of their circularly polarized components. The modulating microwave may have a frequency of 250MHz, and the pulse train to be modulated consists of nsec pulses following each other at a distance of 10 nsec. In view of the peculiarity of the equilibrium points elucidated above, the pulse separation amounts to half the period, i.e., to 2 nsec. For a modulating structure having a length of about 15 cm. the magnetic field strength necessary for a separation of 2 nsec. is of the order of 10 Gauss.

While the invention has been particularly shown and described with reference to a preferred embodiment thereof, it will be understood by those skilled in the art that various changes in form and details may be made therein without departing from the spirit and scope of the invention.

I claim:

1. An optical pulse doubler comprising:
   an optically resonant medium capable of attaining a self-induced transparency state at resonance;
   means for applying polarized light pulses to said resonant medium to cause said medium to attain the self-induced transparency state and to resonate near, but not at, exact resonance and therefor operate at a position displaced from the absorption line of said medium; and
   means for applying a magnetic field to said medium which is parallel to the propagation of light in said medium for separating impinging light pulses into two circulary polarized components displaced both in time and space.

2. The pulse doubler of claim 1, including means for selectively controlling both the magnitude and direction of magnetic field applied to said medium.

3. The pulse doubler of claim 2, including means for translating said circularly polarized pulses into a sequence of linearly polarized pulses.

4. The pulse doubler of claim 3, wherein said optically resonant medium is ruby.

5. The pulse doubler of claim 4 wherein said means for applying polarized light pulses includes a mode-locked ruby laser.

6. The pulse doubler of claim 5 wherein said means for applying the magnetic field includes a microwave pulse generator.

7. An optical pulse doubler comprising:
   an optically resonant medium capable of attaining a self-induced transparency state at resonance;
   means for applying coherent polarized light pulses to said resonant medium having a duration less than the relaxation time of said resonant medium and effective to cause said medium to attain the self-induced transparency state and to resonate near, but not at, exact resonance and therefor cause operation of said medium slightly displaced from its absorption line;
   means for selectively applying a predetermined magnetic field to said medium parallel to the propagation of light therethrough and of a magnitude which is dependent upon the length of said medium and the width of the impinging pulses for selectively separating impinging light pulses into two circularly polarized components displaced both in time and space.

8. The pulse doubler of claim 7 wherein the magnetic field intensity is selectively controlled in both magnitude and direction.

9. The pulse doubler of claim 8, including information input means, connected to said means for applying said magnetic field, operable to control the field applied to said resonant medium.

10. The pulse doubler of claim 9, wherein said information input means includes a microwave pulse generator.

11. The pulse doubler of claim 8, including information input means, connected to said means for applying said magnetic field, operable to control the direction of the field applied to said resonant medium.

12. The pulse doubler of claim 11, including means for translating said circularly polarized pulses into a sequence of linearly polarized pulses.

13. The pulse doubler of claim 12, wherein said optically resonant medium is ruby.

14. A method of generating two circularly polarized components, displaced both in time and space, of a single coherent polarized light pulse, comprising:
   applying coherent polarized light pulses to an optically resonant medium such that said medium resonates near, but not at, exact resonance and attains a self-induced transparency state, and
   applying an axial magnetic field to said resonant medium whose magnitude is dependent upon the length of said medium and the width of the impinging light pulses whereby impinging polarized light pulses are separated into two circularly polarized components displaced both in time and space.

* * * * *